United States Patent
Mirdha et al.

(10) Patent No.: US 11,580,575 B1
(45) Date of Patent: Feb. 14, 2023

(54) SAMPLE-BASED ADVERTISING PLATFORM

(71) Applicant: GM Cruise Holdings LLC, San Francisco, CA (US)

(72) Inventors: Aakanksha Mirdha, San Francisco, CA (US); Alexander Willem Gerrese, San Francisco, CA (US); Alexis De Stasio, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/409,093

(22) Filed: Aug. 23, 2021

(51) Int. Cl.
| | | |
|---|---|---|
| *G06Q 30/02* | (2012.01) | |
| *G06Q 50/30* | (2012.01) | |
| *G07C 9/00* | (2020.01) | |
| *B60R 25/24* | (2013.01) | |
| *G06Q 30/06* | (2012.01) | |
| *G01C 21/34* | (2006.01) | |
| *B60W 60/00* | (2020.01) | |
| *G07C 9/29* | (2020.01) | |
| *G06Q 30/0251* | (2023.01) | |
| *G06Q 30/0601* | (2023.01) | |
| *G06Q 30/0282* | (2023.01) | |

(52) U.S. Cl.
CPC ....... *G06Q 30/0265* (2013.01); *B60R 25/241* (2013.01); *B60W 60/00253* (2020.02); *G01C 21/3476* (2013.01); *G06Q 30/0259* (2013.01); *G06Q 30/0282* (2013.01); *G06Q 30/0633* (2013.01); *G06Q 50/30* (2013.01); *G07C 9/00309* (2013.01); *G07C 9/29* (2020.01)

(58) Field of Classification Search
CPC ........... G06Q 30/0265; G06Q 30/0259; G06Q 30/0282; G06Q 30/0633; G06Q 50/30; B60R 25/241; B60W 60/00253; G01C 21/3476; G07C 9/00309; G07C 9/29
USPC ............................................ 705/14.57, 14.63
See application file for complete search history.

(56) References Cited

U.S. PATENT DOCUMENTS

2015/0348112 A1* 12/2015 Ramanujam ....... G06Q 30/0266
705/14.63

FOREIGN PATENT DOCUMENTS

CA           3057221 A1 *  7/2018  ............. B60Q 1/268

OTHER PUBLICATIONS

Cynthia Choo, New Grab service allows customers to get samples, buy products on their rides, 2018 (Year: 2018).*

(Continued)

*Primary Examiner* — Tarek Elchanti
(74) *Attorney, Agent, or Firm* — Akona IP

(57) ABSTRACT

Systems and methods for providing product samples to users in autonomous vehicles, thereby allowing businesses to advertise their products via the rideshare platform. A physical advertising platform is provided leveraging existing rideshare and delivery infrastructure to allow businesses to advertise their products by providing samples in rideshare vehicles and/or with rideshare vehicle deliveries. Consumers have the opportunity to try new products from local businesses that they may otherwise not be exposed to. In some implementations, a rideshare application interface can allow users to see what new local product samples are available. In some examples, a user can select one or more product samples to try.

20 Claims, 9 Drawing Sheets

(56) References Cited

OTHER PUBLICATIONS

Robert Williams, Hershey's partnership with Cargo closes the sales funnel with on-the-go, mobile consumers. Cargo in the past year has expanded its partnership with Uber to put more its vending boxes into ride-hailing cars in major cities, 2019 (Year: 2019).*

* cited by examiner

500

SAMPLE-BASED ADVERTISING PLATFORM

FIELD OF THE DISCLOSURE

The present disclosure relates generally to autonomous vehicles (AVs) and to systems and methods for advertising in autonomous vehicles.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

While passengers are riding in autonomous vehicles, targeted ads can be played and/or displayed. However, for most products, digital screen-based and audio platforms offer a limited glimpse into the actual product. It can be difficult for businesses to convey their product experience on these platforms.

SUMMARY

Systems and methods are provided for providing product samples to users in autonomous vehicles. Providing samples allows businesses to advertise their products via the rideshare platform. Thus, a physical advertising platform is provided leveraging existing rideshare and delivery infrastructure to allow businesses to advertise their products by giving away samples in rideshare vehicles and/or with rideshare vehicle deliveries. On the consumer side, consumers have the opportunity to try new products from local businesses that they may otherwise not be exposed to. In some implementations, a rideshare application interface can allow users to see what new local product samples are available. In some examples, a user can select one or more product samples to try.

According to one aspect, a method for sample-based advertising in an autonomous vehicle comprises: receiving a ride request including a pick-up location and a drop-off location; generating a route from the pick-up location to the drop-off location; identifying businesses along the generated route that provide in-vehicle samples; determining in-vehicle sample options based, at least in part, on the identified businesses associated with respective in-vehicle sample options, receiving a selection including a selected sample from a first business.

In some implementations, the method includes selecting the autonomous vehicle for the ride request based on the sample selection, wherein the selected autonomous vehicle is carrying the selected sample. In some implementations, the method includes unlocking a container in the autonomous vehicle, wherein the selected sample is in the container. In some implementations, unlocking the container comprises scanning an activation code from a mobile device. In some implementations, the method includes presenting a first option to stop at the first business. In some implementations, the method includes presenting a second option to place an order for pick-up at the first business. In some implementations, generating the route from the pick-up location to the drop-off location includes generating a plurality of routes and selecting the generated route that includes the businesses that have provided the in-vehicle samples. In some implementations, the method includes receiving a feedback rating for the selected sample.

According to another aspect, a system for defining a sample-based advertising in an autonomous vehicle fleet comprises: an online portal configured to receive a ride request including a pick-up location and a drop-off location; and a central computing system configured to: receive the ride request, identify a business between the pick-up location and the drop-off location, wherein the business provides in-vehicle samples, generate a route passing near the business, and select an autonomous vehicle that has a first in-vehicle sample from the business available onboard.

In some implementations, the online portal is further configured to receive a user selection for the first in-vehicle sample. In some implementations, the online portal is further configured to receive a request to stop at the business. In some implementations, the central computing system is further configured to add to the route an intermediate stop at the business. In some implementations, the online portal is further configured to present an option to submit an order for pick up at the selected business. In some implementations, the system includes a passenger interface configured to present an activation code to unlock a compartment in the autonomous vehicle, wherein the compartment contains the first in-vehicle sample.

According to another aspect, a system for sample-based advertising in an autonomous vehicle comprises: a plurality of samples from a local business; a plurality of containers, each configured to hold a respective sample of the plurality of samples; and an onboard computer configured to: receive a sample request, receive a scanned activation code, and unlock a respective container of the plurality of containers corresponding to the sample request, based on the scanned activation code.

In some implementations, the system includes an in-vehicle tablet configured to present at least one sample selection. In some implementations, the system includes a screen on the exterior of the autonomous vehicle configured to display instructions for accessing the respective container. In some implementations, the system includes a central computing system configured to communicate with the onboard computer, and wherein the central computing system is configured to transmit a route for the autonomous vehicle to the onboard computer. In some implementations, the central computing system is further configured to receive an intermediate stop request, and update the route to include the intermediate stop, wherein the intermediate stop includes a business corresponding to the sample request. In some implementations, the autonomous vehicle is a first autonomous vehicle and further comprising a central computing system configured to receive a ride request including a pick-up location at the first autonomous vehicle and a destination location at the local business. In some implementations, the scanned activation code and the ride request are both associated with a first user account.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for providing product samples to users in autonomous vehicles. Providing samples allows businesses to advertise their products via the rideshare platform. In general, most commonly used ad platforms allow businesses to advertise their products only using digital screen-based formats such as posts, stories, emails, etc. While such forms of advertising offer very targeted customer reach to the business on a large scale, and can also be used for in-vehicle advertising on screens within a vehicle, the screen-based interaction offers a very limited glimpse into the actual product. It can be difficult for businesses to convey their product experience using just a graphic post.

Some businesses, such as bakeries, restaurants, cafes, and cosmetic stores, give away free samples to customers already making a purchase in order to give the customers the opportunity to try a new product (and, hopefully, return to purchase the new product). However, this approach is limited in terms of its reach, since only customers who already know about a store and/or brand are trying the new products.

On the consumer side, similarly, the ad experience is generally restricted to digital or printed advertisements. However, these ads can only partly convey the actual product experience because the nature of the advertisement is visual. Users often come across new brands and products but are hesitant to commit to something new without testing a sample and experiencing the product in its entirety. Additionally, when consumers are interested in trying a new product, they may not know where to find stores offering the product. Even if a consumer does find a new store and/or brand of interest, the cost of visiting a store or buying something new and then returning it if it doesn't align with expectations can seem too high. This can be a deterrent for consumers to visit new businesses and try new products.

Systems and methods are provided herein to overcome some of these advertising hurdles and provide a platform for consumers to conveniently try new products. In particular, a physical advertising platform is provided leveraging existing rideshare and delivery infrastructure to allow businesses to advertise their products by giving away samples in rideshare vehicles and/or with rideshare vehicle deliveries. On the consumer side, consumers have the opportunity to try new products from local businesses that they may otherwise not be exposed to. In some implementations, a rideshare application interface can allow users to see what new local product samples are available. In some examples, a user can select one or more product samples to try.

Example Autonomous Vehicle Configured for Sample-Based Advertising

Figure 1:
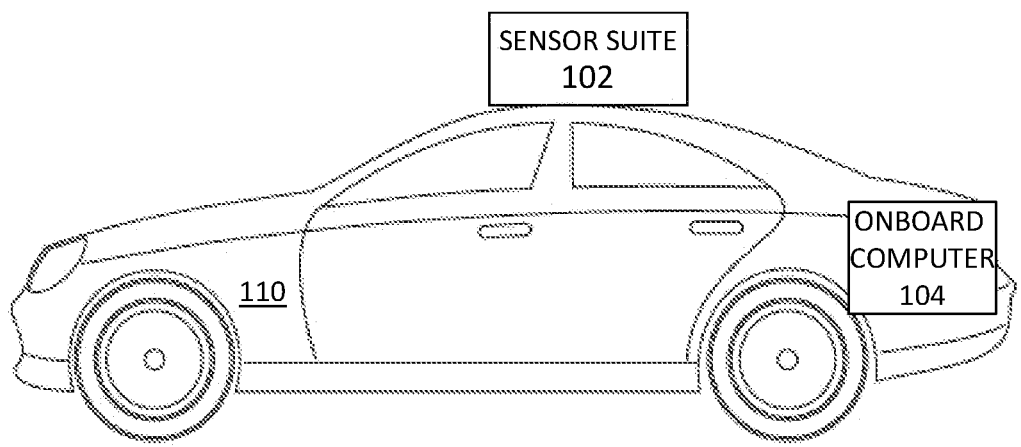
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for providing a sample-based advertising platform.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

In some implementations, data from the sensor suite 102 can be used to detect a passenger exiting a vehicle and/or to determine that a passenger has exited a vehicle. In some examples, the sensor suite 102 can be used to track initial movements of the passenger after the passenger exits the vehicle. In some examples, a passenger drop-off determination is satisfied by detecting that a passenger has exited the vehicle. For instance, interior and/or exterior cameras can be used to detect that a passenger has exited the vehicle. In some examples, other interior and/or exterior sensors can be used to detect that a passenger has exited the vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. Based upon the vehicle state and programmed instructions, the onboard computer 104 controls and/or modifies driving behavior of the autonomous vehicle 110.

In some implementations, the autonomous vehicle 110 includes compartments for storing samples to offer to passengers. In some examples, the compartments are locked, and a user can unlock a compartment using a tablet inside the autonomous vehicle 110. Sensors inside the autonomous vehicle 110 can be used to detect whether a compartment has been opened. Additionally, sensors within the compartment can be used to determine whether a sample was removed from the compartment.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Sample-Based Advertising

Figure 2:
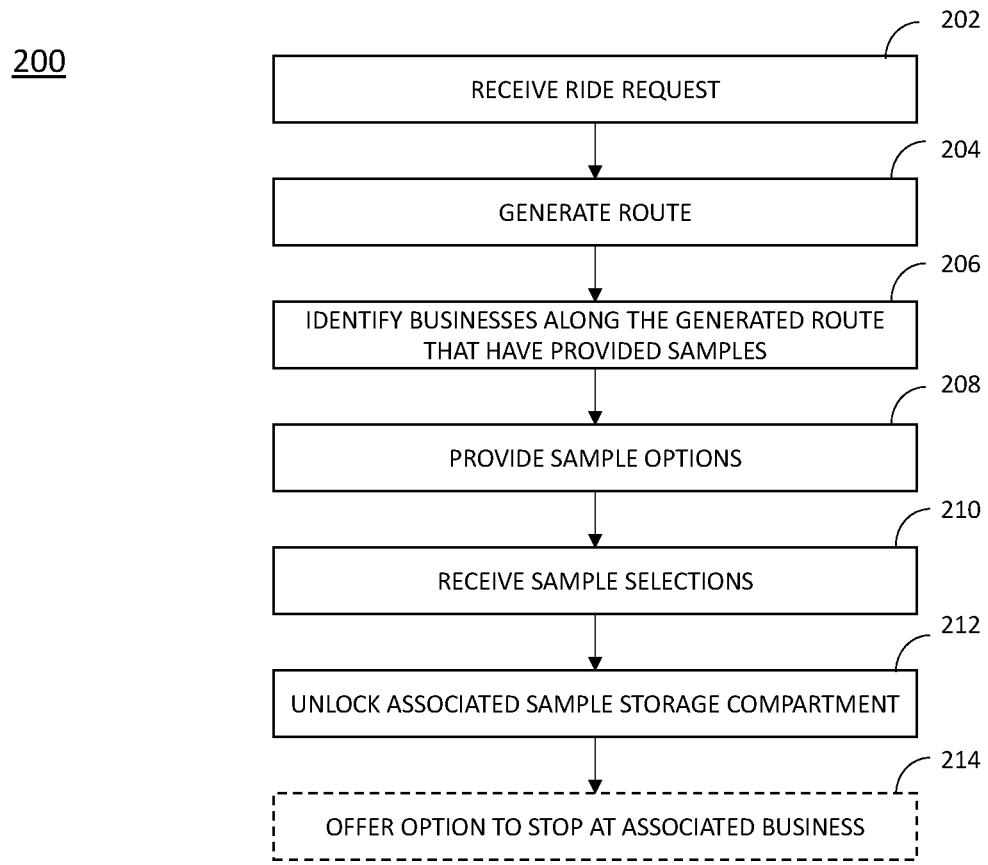
FIG. 2 is a diagram illustrating a method for sample-based advertising, according to some embodiments of the disclosure.

FIG. 2 is a diagram illustrating a method 200 for sample-based advertising, according to various embodiments of the disclosure. In particular, the method 200 is a method for a rideshare application to provide samples to autonomous vehicle passengers. Providing samples to autonomous vehicle passengers allows local businesses to advertise products to the passengers. Various types of businesses can provide samples for in-vehicle advertising, including, but not limited to, cosmetics stores, bakeries, restaurants, cafes, liquor stores, candy shops, electronics stores, game stores, and toy stores.

At step 202, a ride request is received including a pick-up location and a drop-off location. In some examples, a user submits a ride request through a rideshare application. The rideshare request is received at a central computing system having a routing coordinator. At step 204, one or more potential routes for the ride are generated. At step 206, businesses that have provided in-vehicle samples and are located along (or close to) the potential routes are identified. The in-vehicle samples associated with these businesses are also identified and selected as samples to be offered to the user. In some examples, in-vehicle samples are offered based on the time of day, such that breakfast items (e.g., a coffee, a croissant, etc.) are offered in the morning and/or before a selected time, while dessert items (e.g., chocolate, ice cream, etc.) are offered in the afternoon and evenings.

At step 208, sample options are presented to the user. In some examples, sample options are presented to the user via the rideshare application. In some implementations, the sample options are presented to the user via the rideshare application before the ride request is finalized, and the central computing system selects an autonomous vehicle that has the selected sample available on board. Additionally, the central computing system selects a route for the autonomous vehicle that passes near the business associated with the selected sample. In some examples, sample options are presented on a tablet inside the autonomous vehicle, and passengers can select one or more samples via the tablet. In various implementations, sample options are presented via the rideshare application and then again on the tablet in the vehicle. For example, certain samples (and associated businesses) can be featured via the rideshare app. In some examples, different and/or additional samples are available for the selection on the tablet in the autonomous vehicle than were available on the rideshare interface.

At step 210, user sample selections are received. In some examples, when sample options are presented to the user via the rideshare application, sample selections are received at a central computer via the rideshare application. An autonomous vehicle having the selected sample available is identified and assigned to the ride. When sample options are presented on a tablet inside the autonomous vehicle, sample selections are received at the onboard computer. At step 212, a sample storage compartment containing the selected sample is identified and unlocked for passenger access to the sample.

In various implementations, the passenger is provided an opportunity to review an in-vehicle sample. The review can be submitted through the rideshare application or through an in-vehicle tablet. The review can include a star rating (e.g., one, two, three, four, or five stars), and it can also include a written product review. In some examples, the rideshare company can use the reviews to determine which samples to continue to offer and which samples to discontinue. Additionally, user reviews for various product types can be used to guide decisions regarding which in-vehicle samples to provide in the future.

In some examples, samples are available for passengers to keep (e.g., consumables), while in other examples, samples are available for passengers to try out but are then left in the vehicle (e.g., gadgets and goods). In some implementations, passengers may be asked to return a sample product to a vehicle compartment, and may be incentivized to do so.

In some implementations, the rideshare application has data about a user that can be used to generate targeted advertisements and can similarly be used to offer targeted samples. Rideshare application data includes, for example, past trip data as well as any other data a user has elected to share with a rideshare application. For example, a user who frequently travels to health food stores, the gym, and parks may be offered health-focused product samples. In some implementations, the rideshare application allows users to enter default sample preferences. In some examples, sample preferences are categories such as "fragrances", "gadgets", "beverages", and "foods".

After a user has sampled a product, at step 214, the user is offered the option to stop at the business associated with the sample. If the sample was offered based, at least in part, on the associated business being located along the generated route, the autonomous vehicle can make a stop at the business without adding a significant detour (and without adding a lot of time) to the ride. Thus, the additional stop can be offered at little or no cost to the user, and with minor inconvenience to the user.

Furthermore, in some implementations, when a user chooses to stop at the business associated with the sample, the user is presented with a website link to order products from the business for pick-up. In this manner, after sampling the product, the user can place an order for various products from the business, and, when the autonomous vehicle arrives at the business, the user's order can be ready for the user to pick-up. After picking up the order from the business, the user can then seamlessly continue the ride.

Figure 3:
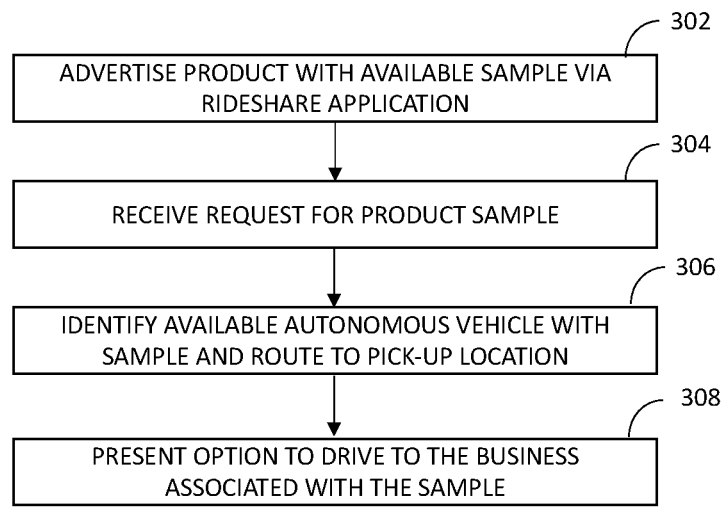
FIG. 3 is a diagram illustrating another method for sample-based advertising, according to some embodiments of the disclosure.

FIG. 3 is a diagram illustrating another method 300 for sample-based advertising, according to various embodiments of the disclosure. In particular, the method 300 is a method for a rideshare application to provide samples to application users who have not ordered an autonomous vehicle ride. Providing samples to local rideshare users allows businesses to advertise products to interested customers.

At step 302, a product with an available sample in an autonomous vehicle is advertised in a rideshare application. In some examples, in the rideshare application, a user can request to view available samples. In other examples, the sample advertisement is displayed when a user is viewing the rideshare application. At step 304, through the rideshare application, the user can request that a selected sample be delivered to them at a specified address. In some examples, the sample is delivered to the user for free, and in other examples, the sample is delivered to the user for a small fee. In some examples, the business providing the sample pays a fee for the sample to be delivered to the user (or for a certain number of samples to be delivered to various users).

At step 306, an available autonomous vehicle carrying the selected sample is identified and routed to the specified address. The specified address is the pick-up location where the user will pick up the sample from the autonomous vehicle. When the autonomous vehicle arrives at the pick-up location, the user retrieves the sample. In some examples, the sample is stored in a container in the autonomous vehicle, and, in some examples the user unlocks the container using a QR code in the rideshare application. In other implementations, a user unlocks the container using a different type of technology, such as a biometric sensor, a Bluetooth signal, an NFC signal, or some other remote signal from the user's mobile device. There may be multiple containers in the autonomous vehicle, and the autonomous vehicle can provide an indication to the user of which container contains the ordered sample. In one example, the container itself has a light or symbol on it indicating it is the selected container.

At step 308, after the user has retrieved the sample from the autonomous vehicle, the user is presented with the option to drive to the business associated with the sample to purchase additional products. In some examples, this option is presented to the user via the rideshare application. In some examples, the autonomous vehicle itself asks the user if they would like to drive to the associated business. In some examples, the autonomous vehicle waits at the pick-up location for a selected period of time in case the user opts to travel to the business. In some examples, a drive to the business is offered at a discount as an incentive for the user to visit the business. For instance, the business may provide the discounted autonomous vehicle ride to the user by paying a fee to the rideshare provider. In other examples, the business may offer a temporary product discount for purchases by users who travel to the business within a selected period of time after sampling the business's products.

In some examples, rideshare vehicles are used for deliveries, such as grocery deliveries, take-out order deliveries, and other package deliveries. In various implementations, when a user places an order for delivery via a rideshare vehicle, the user can also select one or more samples for delivery with the order. In some examples, the user is prompted with sample offers in the rideshare application.

Figure 4:
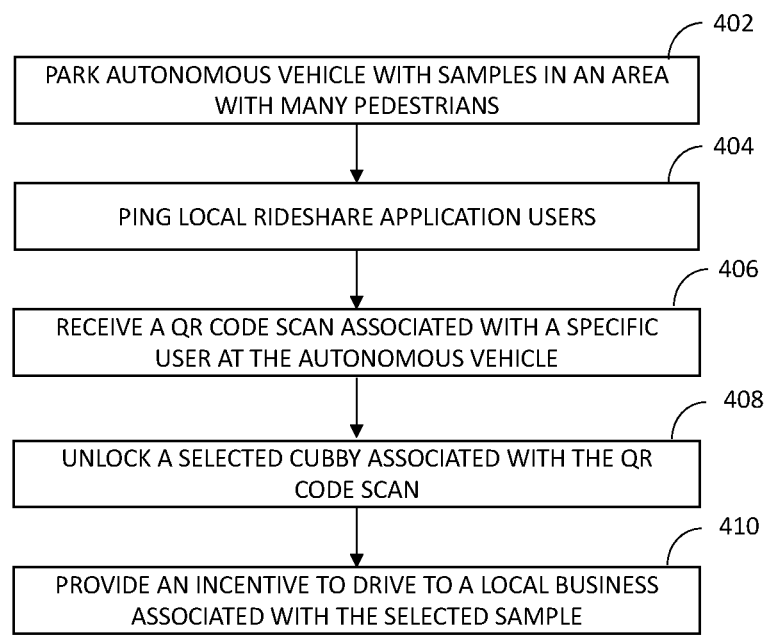
FIG. 4 is a diagram illustrating another method for sample-based advertising, according to some embodiments of the disclosure.

FIG. 4 is a diagram illustrating another method 400 for sample-based advertising, according to various embodiments of the disclosure. In particular, the method 400 is a method for a pop-up autonomous vehicle sampling service. The pop-up service uses an autonomous vehicle to provide samples to local users. Providing samples to local users via a pop-up service allows businesses to advertise products to interested customers and also allows the rideshare provider to advertise its service.

At step 402, an autonomous vehicle containing multiple samples is parked in an area with many pedestrians. The selected parking space for the autonomous vehicle may be strategically determined based on general pedestrian traffic, or expected crowds for a particular event. In some examples, the autonomous vehicle is configured to include many containers for various samples. In some examples, the autonomous vehicle is configured with containers instead of passenger seating. The outside of the autonomous vehicle can include multiple screens advertising the available product samples, to draw attention of local pedestrians who may be interested in the samples.

At step 404, rideshare application users in the vicinity of the pop-up vehicle are alerted of the presence of the pop-up vehicle. This may include any rideshare application users within a certain radius of the pop-up vehicle. Rideshare user location is determined through the rideshare application for individual users who have currently enabled location services for the application. In some examples, users who have enabled notification services from the rideshare application receive an alert regarding the presence of the pop-up vehicle, while users who have disabled notification services from the rideshare application are alerted of the presence of the pop-up vehicle.

In various implementations, pedestrians who are not rideshare application users can download the rideshare application and create an account. In some examples, one or more screens on the pop-up autonomous vehicle include instructions for becoming a rideshare application user. In this manner, the pop-up vehicle also advertises the rideshare service and may entice people to become new rideshare application users.

At step 406, an activation code scan identifying a specific user is received at the autonomous vehicle. In some examples, the activation code is a QR code. In other examples, the activation code is a NFC code, a Bluetooth code, and/or another remote command. In some examples, a biometric sensor is used to identify the specific user. The QR code scan can be associated with a request to access a selected sample. For example, a user may identify a desired sample via a code or other information on the container the sample is stored in. In some examples, the samples are provided to users for free, while in other examples, the samples are provided to users for a small fee. In various implementations, one or more screens on the autonomous vehicle provide instructions on how to unlock the cubbies and access the samples.

At step 408, the selected cubby containing the desired sample chosen by the user associated with the scanned QR code is unlocked, providing the user with access to take the sample.

At step 410, an incentive is provided to the user via the rideshare application to go to the business associated with the provided sample. For example, the user may be provided with a store credit or coupon. In another example, an autonomous vehicle credit may be provided for the user to take an autonomous vehicle to the store. The autonomous vehicle credit may cover a portion of the cost of the ride, and it may cover the entire cost of the ride. In general, after sampling a product, users are incentivized to go to the business and buy products. In some examples, new users who become rideshare application users after visiting the pop-up vehicle can take their first ride to the advertised business.

Example Vehicle for Sample-Based Advertising

Figure 5A:
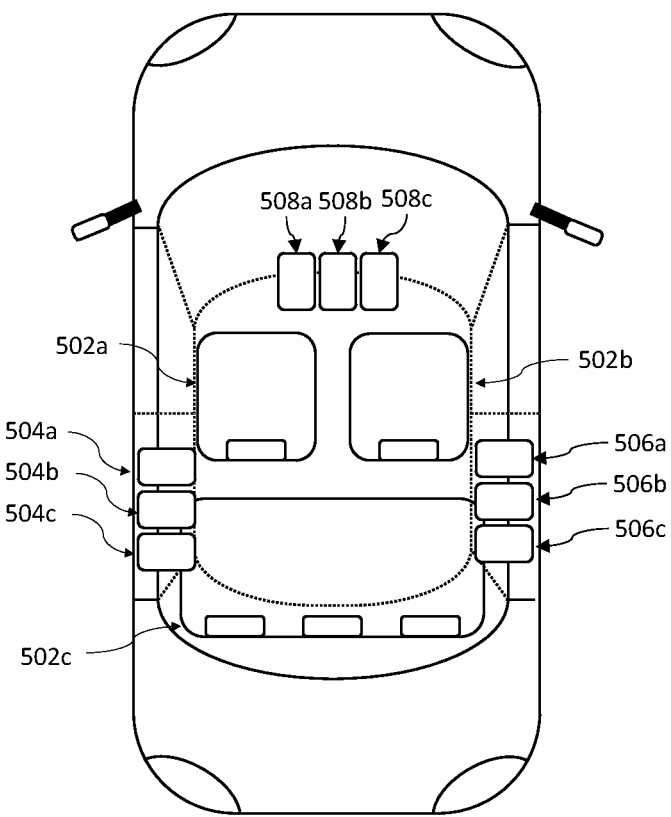
FIGS. 5A-5B are diagrams illustrating autonomous vehicles for sample-based advertising, according to various embodiments of the disclosure.
Figure 5B:
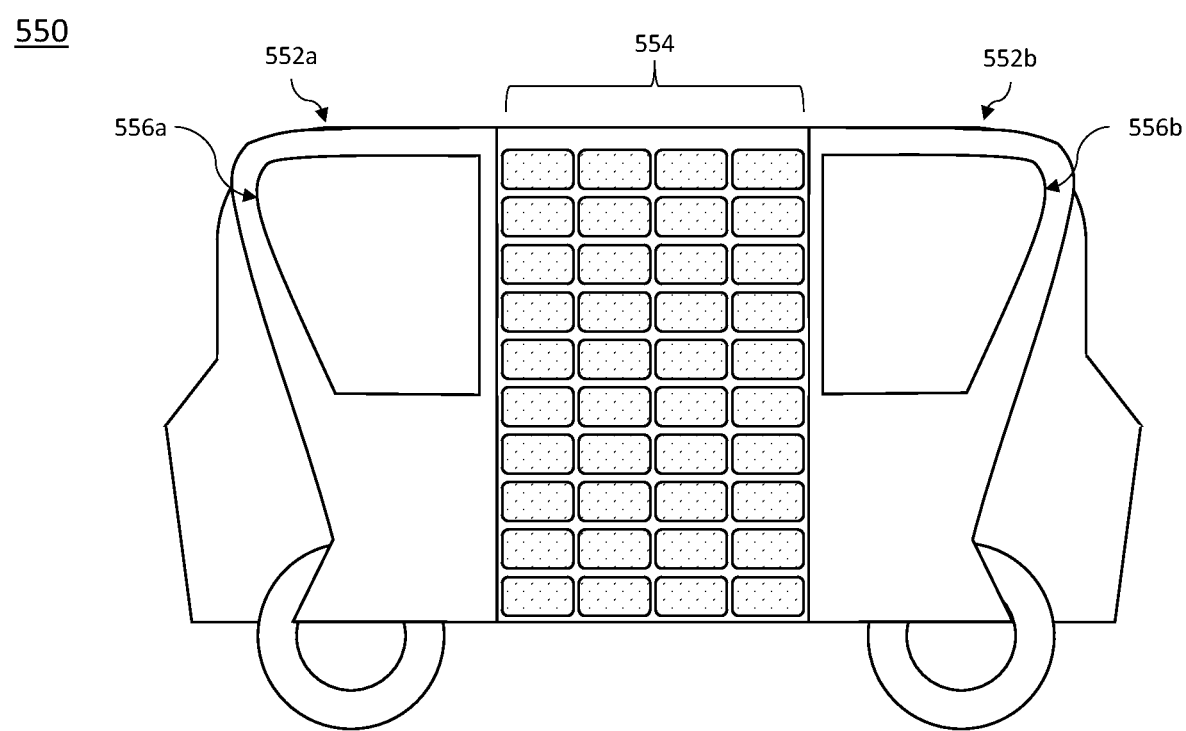

FIGS. 5A-5B are diagrams illustrating autonomous vehicles 500, 550 for sample-based advertising, according to various embodiments of the disclosure. The autonomous vehicle 500 includes passenger seating 502a, 502, 502c and multiple containers 504a-504c, 506a-506c, 508a-508c which can be used to store product samples. Thus, the autonomous vehicle 500 is designed to provide samples to autonomous vehicle passengers while the passengers are riding in the autonomous vehicle 500 to a destination. In particular, each of the containers 504a-504c, 506a-506c, 508a-508c can contain one or more samples from local businesses. The individual containers 504a-504c, 506a-506c, 508a-508c can be unlocked via either a user's rideshare application or via a tablet in the autonomous vehicle 500. In various examples, a passenger can scan a QR code on a passenger mobile device to unlock a container 504a-504c, 506a-506c, 508a-508c and access a sample therein. In various implementations, the containers 504a-504c, 506a-506c, 508a-508c are temperature-controlled and thus can be used to store food at a selected temperature. In some examples, a container 504a-504c, 506a-506c, 508a-508c contains multiple samples, and is designed such that only a single sample is available each time the container is unlocked.

In some examples, a passenger has chosen a sample via the rideshare application before entering the vehicle, and the container with the sample is unlocked for the user upon entry into the vehicle. In other examples, a passenger sees the samples in the autonomous vehicle 500 after entering the vehicle and decides to try one. In some examples, first containers 504a, 504b, 504c contain samples of a first product, second containers 504b, 506b, 508b contain samples of a second product, and third containers 504c, 506c, 508c contain samples of a third product. A passenger sitting on the left side of the rear seat 502c can most easily access the samples to the left of that seat, in containers 504a, 504b, 504c. A passenger sitting on the right side of the rear seat 502c can most easily access the samples to the right of that seat, in containers 506a, 506b, 506c. Similarly, a passenger sitting in one of the front seats 502a, 502b can most easily access samples in the front of the cabin, in containers 508a, 508b, 508c. In some examples, the samples are available for passengers to keep, and in other examples, the samples are available for passengers to try and then return to the container.

FIG. 5B illustrates an autonomous vehicle 550 for sample-based advertising that does not include passenger seating, according to various embodiments of the disclosure. The autonomous vehicle 550 includes doors 552a, 552b, which are opened to reveal multiple containers 554 which can be used to store product samples. Thus, the autonomous vehicle 550 is configured to provide samples to users via a pop-up autonomous vehicle sample event, as described above with respect to FIG. 4. In some examples, the autonomous vehicle 550 can also be used to deliver a requested sample to a user at a specified location.

Each of the 554 can contain one or more samples from local businesses. The containers 554 containers can be unlocked via either a user's rideshare application or via a tablet in the autonomous vehicle 500. In various examples, a user can scan a QR code on a mobile device to unlock a container 554 and access a sample therein. In other examples, a user can use a biometric sensor to unlock a container 554. In further examples, NFC, Bluetooth, and/or other remote commands from a user's mobile device can be used to identify a user and unlock a container 554.

In various implementations, the windows 556a, 556b of the autonomous vehicle 550 act as screens and display advertisements for one or more businesses whose product samples are offered in the containers 554. In some examples, one or more of the windows 556a, 556b display instructions for gaining access to a container and the sample therein. In some examples, one or more of the windows 556a, 556b indicate how to download a rideshare application in order to sample a product from a container 554.

Example Device for Sample-Based Advertising

Figure 6A:
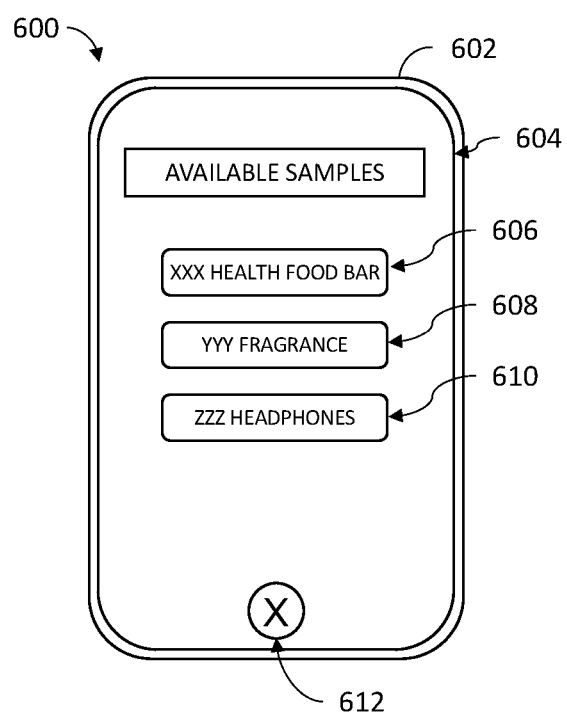
FIGS. 6A and 6B show examples of a device interface for sample-based advertising, according to various embodiments of the disclosure.
Figure 6B:
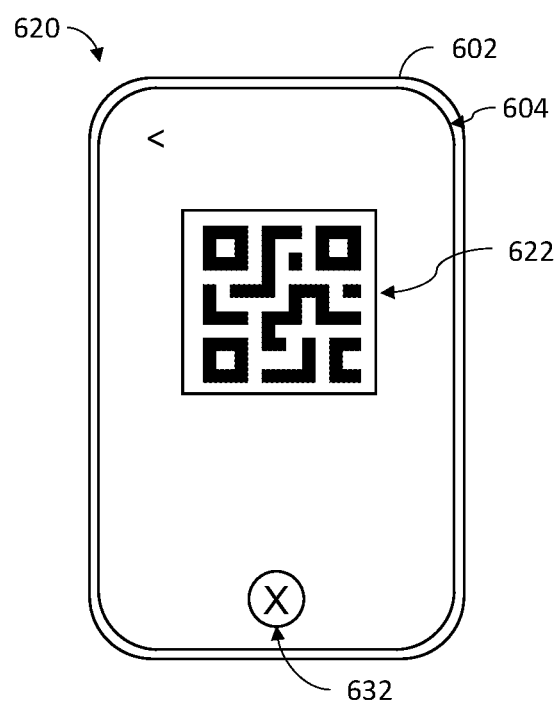

FIGS. 6A and 6B show examples 600, 620 of a device interface for sample-based advertising, according to some embodiments of the disclosure. In particular, FIG. 6A shows an example 600 of a device 602 showing a rideshare application interface 604 for selecting specific samples to try. In some examples, the available sample interface is shown after a user begins a ride request submission. In some examples, a user can navigate to the available sample interface without beginning a ride request, and choose to have one or more samples delivered.

As shown in FIG. 6A, the available samples include a first sample ("XXX health food bar"), a second sample ("YYY Fragrance"), and a third sample ("ZZZ Headphones"). A user can select the first sample by selecting the first button 606, a user can select the second sample by selecting the second button 608, and a user can select the third sample by selecting the third button 610. In practice, the names on each button include the brand name of the product, and thus a user viewing the buttons is viewing an advertisement for the associated product and/or business. According to various implementations, products such as headphones may be available for a user to try out during a ride, but are not available for a user to take with them.

FIG. 6B shows a QR code 622 displayed in the rideshare interface. In various examples, when a user selects a sample (i.e., when a user selects one of the first 606, second 608, and third 610 buttons), the QR code 622 is displayed for the user to unlock a container holding the respective sample. In this manner, the individual containers can be unlocked via a user's rideshare application, and the user can then access the sample therein. In some examples, the user allows an in-vehicle tablet to scan the QR code 622. In other examples, a QR code scanner is positioned adjacent to the sample containers. In some implementations, instead of a QR code, a different type of mechanism is used to unlock a sample container. In some examples, technology that can be used to identify a user and unlock a sample container includes a Bluetooth signal, a NFC signal, and/or another remote command signal from the user's mobile device. In some examples, a biometric sensor and/or signal is used to identify the user and unlock a sample container.

In various implementations, after unlocking a container, the rideshare application interface provides an option for a user to stop at a business associated with the sample. Additionally, the rideshare application interface may provide the user with an option to order products from the business for pick-up. Then, when the autonomous vehicle stops at the business, the user's order can be ready, resulting in minimal detour time and minimal inconvenience to the user.

Example of Autonomous Vehicle Fleet

Figure 7:
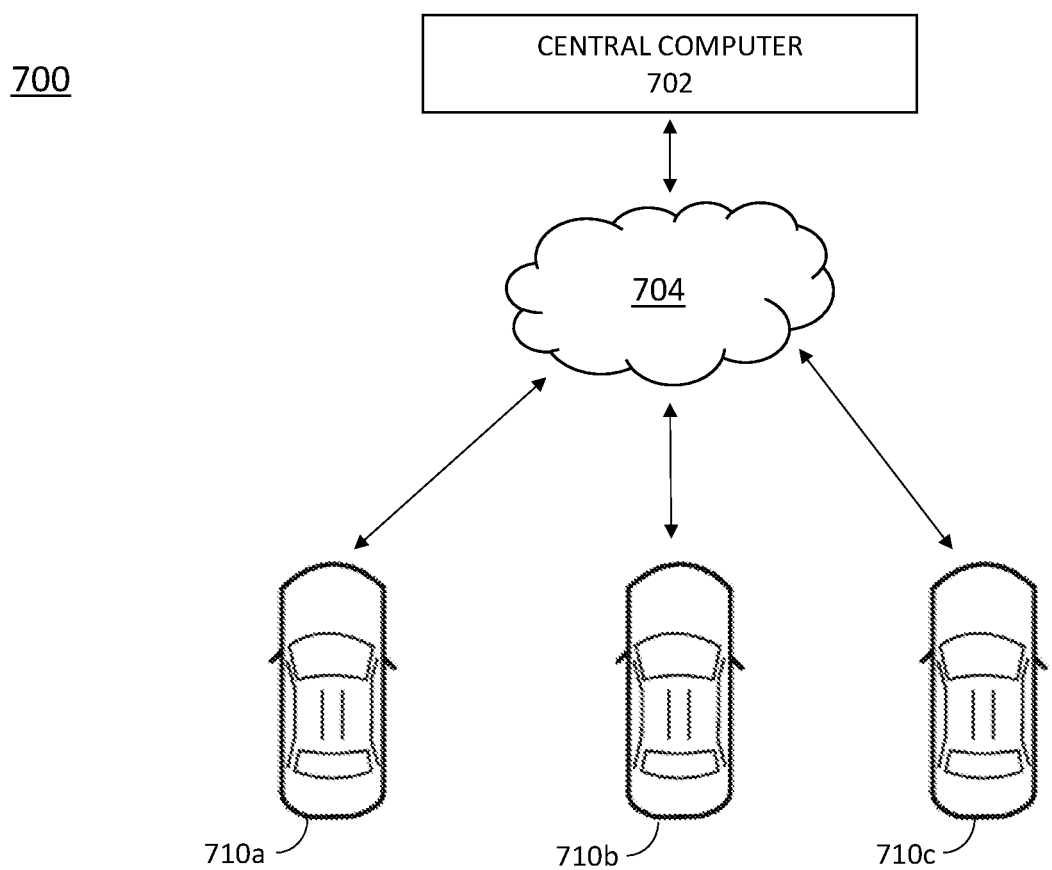
FIG. 7 is a diagram illustrating a fleet of autonomous vehicles in communication with a central computer, according to some embodiments of the disclosure.

FIG. 7 is a diagram 700 illustrating a fleet of autonomous vehicles 710a, 710b, 710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-710c in the fleet. Autonomous vehicle fleet routing refers to the routing of multiple vehicles in a fleet. The central computer also acts as a centralized ride management system and communicates with rideshare users via a rideshare service 706. The vehicles 710a-710c can each be used to implement the sample-based advertising methods of FIGS. 2-4. In some implementations, the autonomous vehicles 710a-710c communicate directly with each other.

When a passenger requests a ride through a rideshare service 706, the rideshare service 706 sends the request to central computer 702. The central computer 702 selects a vehicle 710a-710c based on the request. When the vehicle 710a-701c picks up the passenger, the passenger device is detected and a connection is established with the passenger device, as described above with respect to the methods of FIGS. 2 and 5. The vehicle 710a-710c continues to monitor the device. However, if the device is left in the vehicle 710a-710c after the passenger exits the vehicle 710a-710c, the vehicle 710a-710c contacts the central computer 702 to begin the device recovery protocol. The vehicles 710a, 710b, 710c communicate with a central computer 702 via a cloud 704.

Once a destination is selected and the user has ordered a vehicle, the routing coordinator can optimize the routes to avoid traffic as well as vehicle occupancy. In some examples, an additional passenger can be picked up en route to the destination, and the additional passenger can have a different destination. In various implementations, since the routing coordinator has information on the routes for all the vehicles in the fleet, the routing coordinator can adjust vehicle routes to reduce congestion and increase vehicle occupancy.

As described above, each vehicle 710a-710c in the fleet of vehicles communicates with a routing coordinator. Thus, information gathered by various autonomous vehicles 710a-710c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, the routing coordinator uses collected position data corresponding to emergency events to generate a best route for an autonomous vehicle to avoid a potential emergency situation.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pickup location and destination location, and an onboard computer on the selected autonomous vehicle generates a route and navigates to the destination. In some implementations, the routing coordinator in the central computing system 702 generates a route for each selected autonomous vehicle 710*a*-710*c*, and the routing coordinator determines a route for the autonomous vehicle 710*a*-710*c* to travel from the autonomous vehicle's current location to a destination.

Example of a Computing System for Ride Requests

Figure 8:
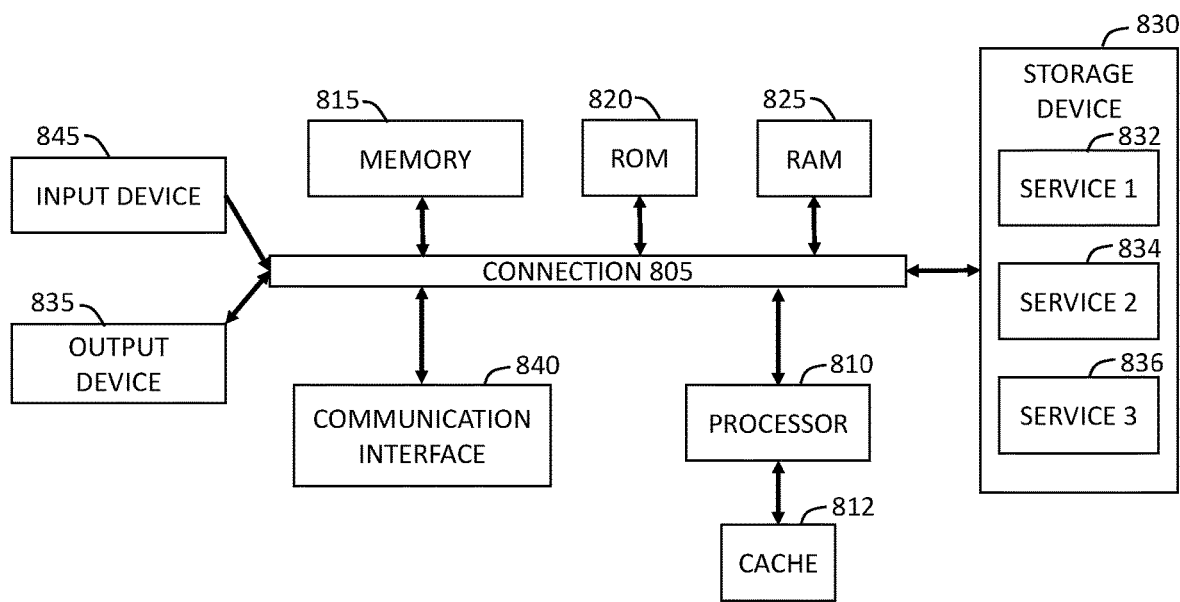
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 702, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for sample-based advertising in an autonomous vehicle, comprising: receiving a ride request including a pick-up location and a drop-off location; generating a route from the pick-up location to the drop-off location; identifying businesses along the generated route that provide in-vehicle samples; determining in-vehicle sample options based, at least in part, on the identified businesses associated with respective in-vehicle sample options, receiving a selection including a selected sample from a first business.

Example 2 provides a method according to one or more of the preceding and/or following examples, further comprising selecting the autonomous vehicle for the ride request based on the sample selection, wherein the selected autonomous vehicle is carrying the selected sample.

Example 3 provides a method according to one or more of the preceding and/or following examples, further comprising unlocking a container in the autonomous vehicle, wherein the selected sample is in the container.

Example 4 provides a method according to one or more of the preceding and/or following examples, wherein unlocking the container comprises scanning an activation code from a mobile device.

Example 5 provides a method according to one or more of the preceding and/or following examples, further comprising presenting a first option to stop at the first business.

Example 6 provides a method according to one or more of the preceding and/or following examples, further comprising presenting a second option to place an order for pick-up at the first business.

Example 7 provides a method according to one or more of the preceding and/or following examples, wherein generating the route from the pick-up location to the drop-off location includes generating a plurality of routes and selecting the generated route that includes the businesses that have provided the in-vehicle samples.

Example 8 provides a method according to one or more of the preceding and/or following examples, further comprising receiving a feedback rating for the selected sample.

Example 9 provides a system for defining a sample-based advertising in an autonomous vehicle fleet, comprising: an online portal configured to receive a ride request including a pick-up location and a drop-off location; and a central computing system configured to: receive the ride request, identify a business between the pick-up location and the drop-off location, wherein the business provides in-vehicle samples, generate a route passing near the business, and select an autonomous vehicle that has a first in-vehicle sample from the business available onboard.

Example 10 provides a system according to one or more of the preceding and/or following examples, wherein the online portal is further configured to receive a user selection for the first in-vehicle sample.

Example 11 provides a system according to one or more of the preceding and/or following examples, wherein the online portal is further configured to receive a request to stop at the business.

Example 12 provides a system according to one or more of the preceding and/or following examples, wherein the central computing system is further configured to add to the route an intermediate stop at the business.

Example 13 provides a system according to one or more of the preceding and/or following examples, wherein the online portal is further configured to present an option to submit an order for pick up at the selected business.

Example 14 provides a system according to one or more of the preceding and/or following examples, further comprising a passenger interface configured to present an activation code to unlock a compartment in the autonomous vehicle, wherein the compartment contains the first in-vehicle sample.

Example 15 provides a system for sample-based advertising in an autonomous vehicle, comprising: a plurality of samples from a local business; a plurality of containers, each configured to hold a respective sample of the plurality of samples; and an onboard computer configured to: receive a sample request, receive a scanned activation code, and unlock a respective container of the plurality of containers corresponding to the sample request, based on the scanned activation code.

Example 16 provides a system according to one or more of the preceding and/or following examples, further comprising an in-vehicle tablet configured to present at least one sample selection.

Example 17 provides a system according to one or more of the preceding and/or following examples, further comprising a screen on the exterior of the autonomous vehicle configured to display instructions for accessing the respective container.

Example 18 provides a system according to one or more of the preceding and/or following examples, further comprising a central computing system configured to communicate with the onboard computer, and wherein the central computing system is configured to transmit a route for the autonomous vehicle to the onboard computer.

Example 19 provides a system according to one or more of the preceding and/or following examples, wherein the central computing system is further configured to receive an intermediate stop request, and update the route to include the intermediate stop, wherein the intermediate stop includes a business corresponding to the sample request.

Example 20 provides a system according to one or more of the preceding and/or following examples, wherein the autonomous vehicle is a first autonomous vehicle and further comprising a central computing system configured to receive a ride request including a pick-up location at the first autonomous vehicle and a destination location at the local business.

Example 21 provides a system according to one or more of the preceding and/or following examples, wherein the scanned activation code and the ride request are both associated with a first user account.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for sample-based advertising in an autonomous vehicle fleet, comprising:
    receiving, at an online portal, a ride request from a rideshare application including a pick-up location and a drop-off location;
    generating, at a central computing system, a route from the pick-up location to the drop-off location;
    identifying businesses along the generated route that provide in-vehicle samples to vehicles in the autonomous vehicle fleet;
    determining in-vehicle sample options based, at least in part, on the identified businesses associated with respective in-vehicle sample options;
    receiving, at the online portal, a selection from the rideshare application, wherein the selection includes a selected sample from a first business; and
    providing an activation code to the rideshare application, wherein the activation code is to unlock a container containing the selected sample.

2. The method of claim 1, further comprising selecting the autonomous vehicle for the ride request based on the sample selection, wherein the selected autonomous vehicle is carrying the selected sample.

3. The method of claim 1, further comprising unlocking the container in the autonomous vehicle, wherein the selected sample is in the container.

4. The method of claim 1, wherein unlocking the container comprises scanning the activation code from a mobile device.

5. The method of claim 1, further comprising presenting a first option to stop at the first business.

6. The method of claim 5, further comprising presenting a second option to place an order for pick-up at the first business.

7. The method of claim 1, wherein generating the route from the pick-up location to the drop-off location includes generating a plurality of routes and selecting the generated route that includes the businesses that have provided the in-vehicle samples.

8. The method of claim 1, further comprising receiving a feedback rating for the selected sample.

9. A system for sample-based advertising in an autonomous vehicle fleet, comprising:
    an online portal to:
        receive a ride request from a rideshare application including a pick-up location and a drop-off location; and
        receive a selection from the rideshare application, wherein the selection includes a selected sample from a first business; and
    a central computing system to:
        generate a route from the pick-up location to the drop-off location;
        identify businesses along the generated route that provide in-vehicle samples to vehicles in the autonomous vehicle fleet;
        determine in-vehicle sample options based, at least in part, on the identified businesses associated with respective in-vehicle sample options;
        provide an activation code to the rideshare application, wherein the activation code is to unlock a container having the selected sample.

10. The system of claim 9, wherein the central computing system is further to provide the in-vehicle sample options to the online portal.

11. The system of claim 9, wherein the identified businesses include the first business and wherein the in-vehicle sample options include the selected sample.

12. The system of claim 9, wherein the online portal is further to receive, from the rideshare application, a request to stop at the first business.

13. The system of claim 12, wherein the central computing system is further to revise the generated route to add an intermediate stop at the first business.

14. The system of claim 12, wherein the online portal is further to present, via the rideshare application, an option to submit an order for pick up at the first business.

15. The system of claim 9, wherein the central computing system is further to select an autonomous vehicle for the ride request based on the sample selection, wherein the selected autonomous vehicle is carrying the selected sample.

16. The system of claim 15, further comprising a passenger interface in the autonomous vehicle to receive the activation code to unlock the container.

17. A non-transitory computer-readable media comprising instructions that, upon execution of the instructions by a processor of a computing device, are to cause the computing device to:
    receive, at an online portal, a ride request from a rideshare application including a pick-up location and a drop-off location;
    generate a route from the pick-up location to the drop-off location;
    identify businesses along the generated route that provide in-vehicle samples to vehicles in the autonomous vehicle fleet;
    determine in-vehicle sample options based, at least in part, on the identified businesses associated with respective in-vehicle sample options;
    receive, at the online portal, a selection from the rideshare application, wherein the selection includes a selected sample from a first business; and
    provide an activation code to the rideshare application, wherein the activation code is to unlock a container having the selected sample.

18. The non-transitory computer-readable media of claim 17, wherein upon execution of the instructions by the processor of a computing device, cause the computing device further to: select an autonomous vehicle for the ride request based on the selection, wherein the selected autonomous vehicle is carrying the selected sample in the container.

19. The non-transitory computer-readable media of claim 18, wherein upon execution of the instructions by the processor of a computing device, cause the computing device further to: receive the activation code to unlock the container, via a passenger interface in the selected autonomous vehicle.

20. The non-transitory computer-readable media of claim 17, wherein upon execution of the instructions by the processor of a computing device, cause the computing device further to: generate the route from the pick-up location to the drop-off location, including generating a plurality of routes and selecting the generated route that includes the businesses that have provided the in-vehicle samples.

* * * * *